(12) United States Patent
Horishima et al.

(10) Patent No.: US 7,953,941 B2
(45) Date of Patent: *May 31, 2011

(54) DATA PROCESSOR WITH MEMORY CONTROLLER HAVING BURST ACCESS OPERATION

(75) Inventors: Masayoshi Horishima, Tokyo (JP); Hajime Sasaki, Tokyo (JP); Takashi Koshido, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/728,200

(22) Filed: Mar. 20, 2010

(65) Prior Publication Data

US 2010/0174857 A1 Jul. 8, 2010

Related U.S. Application Data

(63) Continuation of application No. 11/631,342, filed as application No. PCT/JP2004/009177 on Jun. 30, 2004, now Pat. No. 7,725,665.

(51) Int. Cl.
*G06F 13/00* (2006.01)
(52) U.S. Cl. ........................................ 711/154; 711/171
(58) Field of Classification Search ................... 711/154, 711/171
See application file for complete search history.

(56) References Cited

U.S. PATENT DOCUMENTS

| 5,517,626 | A | * | 5/1996 | Archer et al. | |
| 5,790,884 | A | * | 8/1998 | Weinman et al. | 710/4 |
| 5,815,646 | A | * | 9/1998 | Purcell et al. | |
| 6,172,936 | B1 | * | 1/2001 | Kitazaki | |
| 6,336,154 | B1 | * | 1/2002 | McCarthy et al. | |
| 2002/0122335 | A1 | * | 9/2002 | Love et al. | |
| 2003/0163624 | A1 | * | 8/2003 | Matsui et al. | 710/301 |

(Continued)

FOREIGN PATENT DOCUMENTS

JP    06-202934 A    *    7/1994

(Continued)

OTHER PUBLICATIONS

K.K. Hitachi Kodaira Semicon, Gijutsu Document Group Hen, Hitachi Super H™ RISC engine SH7750 Series Hardware Manual SH7750, SH7750S, SH7750R, 2002, vol. 6, pp. 1-1 to 1-6 and 13-1 to 13-21.*

*Primary Examiner* — Reba I Elmore
(74) *Attorney, Agent, or Firm* — Miles & Stockbridge P.C.

(57) ABSTRACT

A data processor (1) has a central processing unit (3) and a memory controller (6) capable of controlling a memory (8) to be connected to an outside. The memory has a buffer capable of temporarily holding data within an address range corresponding to a predetermined bit number on a low order side of an address signal, and a burst operation for inputting/outputting data can be carried out by a data transfer between the buffer and the outside for an access request in which an access address is changed within the address range. When causing the memory to carry out the burst operation to give an access, the memory controller performs an access control for freely executing the burst operation of the memory continuously if it detects an access exceeding the address range. When causing the memory to carryout the burst access, the memory controller performs an access control for freely executing the burst operation of the memory continuously if it detects the access exceeding the address range. Therefore, it is not necessary to restrict the burst access exceeding the address range and to limit a burst frequency. Consequently, it is possible to enhance a data transfer performance through the burst access together with the memory.

7 Claims, 7 Drawing Sheets

U.S. PATENT DOCUMENTS

2005/0232059 A1* 10/2005 Miura et al.
2005/0253858 A1* 11/2005 Ohkami et al.

FOREIGN PATENT DOCUMENTS

| JP | 07-006078 A | * | 1/1995 |
| JP | 09-054724 A | * | 2/1997 |
| JP | 10-083343 A | * | 3/1998 |
| JP | 11-126480 A | * | 5/1999 |
| JP | 11-339484 A | * | 12/1999 |
| JP | 2002-236610 A | * | 8/2002 |
| JP | 2002-366428 A | * | 12/2002 |
| JP | 2004-038705 A | * | 2/2004 |

* cited by examiner

FIG. 9

| Area | External address | Capacity | Connectable memory | Bus width which can be set | Access size |
|---|---|---|---|---|---|
| 0 | H'00000000 ~ H'03FFFFFF | 64MB | SRAM | 8, 16, 32 | 8, 16, 32, Bits, 32 Bytes |
| | | | Burst ROM | 8, 16, 32 | |
| | | | MPX | 32 | |
| 1 | H'04000000 ~ H'07FFFFFF | 64MB | SRAM | 8, 16, 32 | 8, 16, 32, Bits, 32 Bytes |
| | | | Burst ROM | 8, 16, 32 | |
| | | | MPX | 32 | |
| | | | Byte control SRAM | 16, 32 | |
| 2 | H'08000000 ~ H'0BFFFFFF | 64MB | SRAM | 8, 16, 32 | 8, 16, 32, Bits, 32 Bytes |
| | | | Burst ROM | 8, 16, 32 | |
| | | | MPX | 32 | |
| 3 | H'0C000000 ~ H'0FFFFFFF | 64MB | (DDR-SDRAM) | 32 | 32 Bits |
| 4 | H'10000000 ~ H'13FFFFFF | 64MB | SRAM | 8, 16, 32 | 8, 16, 32, Bits, 32 Bytes |
| | | | Burst ROM | 8, 16, 32 | |
| | | | MPX | 32 | |
| | | | Byte control SRAM | 16, 32 | |
| 5 | H'14000000 ~ H'17FFFFFF | 64MB | SRAM | 8, 16, 32 | 8, 16, 32, Bits, 32 Bytes |
| | | | MPX | 32 | |
| | | | Burst ROM | 8, 16, 32 | |
| | | | PCMCIA | 8, 16 | |
| 6 | H'18000000 ~ H'1BFFFFFF | 64MB | SRAM | 8, 16, 32 | 8, 16, 32, Bits, 32 Bytes |
| | | | MPX | 32 | |
| | | | Burst ROM | 8, 16, 32 | |
| | | | PCMCIA | 8, 16 | |
| 7 | H'1C000000 ~ H'1FFFFFFF | 64MB | - | - | |

FIG. 13

| Bus width (bit) | Burst frequency | Burst access start address | → | | | | | | |
|---|---|---|---|---|---|---|---|---|---|
| 8 | 4 | H'00 | H'04 | H'08 | H'0C | H'10 | H'14 | H'18 | H'1C |
|   |   | H'08 | H'0C | H'10 | H'14 | H'18 | H'1C | H'00 | H'04 |
|   |   | H'10 | H'14 | H'18 | H'1C | H'00 | H'04 | H'08 | H'0C |
|   |   | H'18 | H'1C | H'00 | H'04 | H'08 | H'0C | H'10 | H'14 |
|   | 8 | H'00 | H'08 | H'10 | H'18 | | | | |
|   |   | H'08 | H'10 | H'18 | H'00 | | | | |
|   |   | H'10 | H'18 | H'00 | H'08 | | | | |
|   |   | H'18 | H'00 | H'08 | H'10 | | | | |
|   | 16* | H'00 | H'10 | | | | | | |
|   |   | H'08 | H'10 | H'00 | | | | | |
|   |   | H'10 | H'00 | | | | | | |
|   |   | H'18 | H'00 | H'10 | | | | | |
|   | 32 | H'00 | | | | | | | |
|   |   | H'08 | H'00 | | | | | | |
|   |   | H'10 | H'00 | | | | | | |
|   |   | H'18 | H'00 | | | | | | |
| 16 | 4 | H'00 | H'08 | H'10 | H'18 | | | | |
|   |   | H'08 | H'10 | H'18 | H'00 | | | | |
|   |   | H'10 | H'18 | H'00 | H'08 | | | | |
|   |   | H'18 | H'00 | H'08 | H'10 | | | | |
|   | 8 | H'00 | H'10 | | | | | | |
|   |   | H'08 | H'10 | H'00 | | | | | |
|   |   | H'10 | H'00 | | | | | | |
|   |   | H'18 | H'00 | H'10 | | | | | |
|   | 16 | H'00 | | | | | | | |
|   |   | H'08 | H'00 | | | | | | |
|   |   | H'10 | H'00 | | | | | | |
|   |   | H'18 | H'00 | | | | | | |
| 32 | 4 | H'00 | H'10 | | | | | | |
|   |   | H'08 | H'10 | H'00 | | | | | |
|   |   | H'10 | H'00 | | | | | | |
|   |   | H'18 | H'00 | H'10 | | | | | |
|   | 8 | H'00 | | | | | | | |
|   |   | H'08 | H'00 | | | | | | |
|   |   | H'10 | H'00 | | | | | | |
|   |   | H'18 | H'00 | | | | | | |

DATA PROCESSOR WITH MEMORY CONTROLLER HAVING BURST ACCESS OPERATION

CROSS-REFERENCE TO RELATED APPLICATION

This application is a continuation of application Ser. No. 11/631,342 filed Dec. 29, 2006 now U.S. Pat. No. 7,725,665, which is a 371 of International Appln. No. PCT/JP2004/009177 filed Jun. 30, 2004.

FIELD OF THE INVENTION

The present invention relates to a data processor comprising a memory controller, and more particularly to a burst access control for a memory and an effective technique applied to a data processor capable of giving a burst access to a flash memory connected to an outside, for example.

BACKGROUND OF THE INVENTION

In a memory having a static RAM interface capable of reading data stored in an address after a certain access time in response to an input of the address, it is possible to employ a burst mode for increasing a speed of a reading operation. For example, an electrically writable flash memory has a burst buffer between a memory array and a data input/output terminal. In the reading operation, data selected from the memory array on a high order side of an address signal are transferred to the burst buffer and the data thus transferred to the burst buffer are selected on a low order side of the address signal and are output to an outside. It is possible to carry out the data output from the burst buffer by enabling an output enable signal. When the low order side of the address signal is changed within a range of a storage capacity of the burst buffer is changed in a state in which the output enable signal is maintained in "enable", then, data held in the burst buffer are output to the outside. For example, when the burst buffer has a size of 16 bytes, data within an address range corresponding to 4 bits on the low order side in a byte address can be output from the burst buffer to the outside by a burst operation.

Patent Document 1 has described a flash memory capable of carrying out a burst read in a clock synchronization against an asynchronous read.

Patent Document 1: JP-A-11-339484 Publication

SUMMARY OF THE INVENTION

The inventor investigated an access control configuration for causing a memory having a static RAM interface to carry out a burst operation. More specifically, in the case in which an access exceeding an address range corresponding to a storage capacity of a burst buffer is to be carried out, it is necessary to read data from a memory array plural times. Accordingly, it is necessary to take a start address of the burst operation into consideration in order to set a frequency of a burst. For example, a data bus width is set to be 16 bits and a size of the burst buffer is set to be 8 words (16 bytes). By fixing high order addresses A4 to Ax (x is an optional integer of 5 or more) and changing 3 bits of low order addresses A1 to A3, it is possible to select data in the burst buffer in 1-word (16-bit) unit, thereby carrying out a burst access. In the case in which a start address of the burst access is H'00, it is possible to give a burst access continuously eight times up to data D0 to D7 by changing a sequential address in order of H'02, H'04, H'06, H'08, H'0A, H'0C and H'0E. In this case, it is preferable to set the frequency of the burst to be eight at a maximum for a memory controller. When the start address of the burst operation is H'08 through the setting, however, data after H'10 provided across a boundary of the burst buffer are not output in an expected timing if the sequential address is changed in order of H'08, H'0A, H'0C, H'0E, H'10, H'12, H'14 and H'16. The reason is as follows. When the address is changed from H'0E to H'10 (a fourth bit of the address is changed), the memory recognizes a first access of the burst operation and a data read from the memory array to the burst buffer is generated so that the data cannot be output in an expected access time. In order to prevent such a drawback from being caused, it is possible to propose that a burst access to be started in a middle address such as the address H'08 is prohibited in software so as to prevent a burst access from being given across a boundary of the burst buffer or a value of the frequency of the burst which can be set to the memory controller is limited to be four or less, for example, so as to freely output the expected data in a permitted start address of H'00 and H'08. However, it is impossible to avoid a deterioration in a data transfer performance through a memory access by any method.

It is an object of the invention to provide a data processor capable of enhancing a data transfer performance through a burst access together with a memory.

The above and other objects and novel features of the invention will be apparent from the description of the specification and the accompanying drawings.

The summary of the typical invention disclosed in the application will be described below.

[1] A data processor has a central processing unit, and a memory controller (6) capable of controlling a memory (8) to be connected to an outside. The memory has a buffer (25) capable of temporarily holding data within an address range corresponding to a predetermined bit number on a low order side of an address signal and is caused to freely carry out a burst operation for inputting/outputting data by a data transfer between the buffer and the outside for an access request in which an access address is changed within the address range. The memory controller carries out a predetermined access control capable of continuously performing the burst operation of the memory if an access exceeding the address range is detected when the memory is caused to carry out the burst operation, thereby giving the access. When the memory controller gives the burst access to the memory, consequently, the access control capable of continuously carrying out the burst operation of the memory is performed if the access exceeding the address range is detected. Therefore, it is possible to enhance a data transfer performance through a burst access without requiring to restrict a burst access exceeding the address range or to limit the frequency of the burst.

In a specific configuration according to the invention, the memory controller detects the access exceeding the address range depending on whether a higher order bit than the predetermined bit number on the low order side is changed or not.

In another specific configuration according to the invention, when detecting the access exceeding the address range, the memory controller carries out a control for extending an output period of the address for the memory, thereby causing the burst operation of the memory to be freely executed continuously. The control for extending the output period of the address serves to maintain a time required for updating data of the buffer when responding to a read request, for example. Consequently, it is possible to wait for an output of expected data. Furthermore, it is also possible to carry out a control for delaying a data output timing from the buffer through an output enable signal simultaneously with the control for extending the output period of the address. The control serves to maintain a time required for transferring the data of the buffer to a writing system circuit when responding to a write request. It is possible to wait for a completion of a data transfer for preventing write data held in the writing system circuit from being undesirably overwritten by write data transferred internally from the buffer.

In a further specific configuration according to the invention, the data processor may have a direct memory access controller capable of giving an access to the memory through the memory controller as a bus master other than the central processing unit.

In a further specific configuration according to the invention, the memory controller has a register (16) to which a value can be set by the central processing unit, and the value to be set to the register specifies a bus width and a burst frequency of an external bus to which an external memory is connected every external memory space. It is possible to obtain a flexibility in a configuration of the burst access to the memory. In this case, the burst frequency which can be specified by the set value of the register is set to be min at a maximum when a storage capacity of the buffer is set to be m bytes and the number of bits of the external bus is set to be n bytes. The memory is at least one memory selected from a flash memory, an EEPROM, a mask ROM and an SRAM, for example.

[2] A data processor according to another aspect has a memory controller capable of controlling a memory to be connected to an outside. The memory has a memory array and a buffer capable of temporarily holding data read from the memory array within an address range corresponding to a predetermined bit number on a low order side of an address signal, and it is possible to carry out a burst reading operation for outputting, from the buffer to the outside, data to meet a read access request in which an access address is changed within the address range when the data are held in the buffer. When causing the memory to carry out the burst reading operation, the memory controller performs a control for maintaining a necessary period of time for updating the data of the buffer by a memory operation responding to a read request exceeding the address range and thus executes the burst reading operation of the memory continuously if it detects the read request. When the memory controller gives a burst read access to the memory, consequently, the access control capable of continuously carrying out the burst reading operation of the memory is performed if an access exceeding the address range is detected. Consequently, it is possible to enhance a data transfer performance through a burst access without requiring to restrict a burst read access exceeding the address range or to limit the frequency of the burst.

[3] A data processor according to a further aspect has a memory controller capable of controlling a memory to be connected to an outside. The memory has a memory array and a buffer capable of temporarily holding data read from the memory array within an address range corresponding to a predetermined bit number on a low order side of an address signal, and information stored in an address specified by an address signal can be output to the outside after a predetermined access time in response to an input of the address signal. When detecting a read request exceeding the address range of data held in the buffer, the memory controller carries out an access control for maintaining a necessary period of time for updating the data of the buffer by a memory operation in response to the read request. When there is provided a static RAM interface capable of outputting stored information to an outside after a predetermined access time in response to the input of the address signal, a selection in the memory array has no change if the access is continuously given within the range of the data held in the buffer. Therefore, it is possible to read necessary data in a short access cycle. By maintaining a period of time required for internally transferring the data selected in the memory array into the buffer in response to a read request exceeding the address range, subsequently, it is possible to continuously carry out an operation for reading the necessary data in the short access cycle.

BRIEF DESCRIPTION OF THE DRAWINGS

FIG. 9 is an address map showing a local address space assigned to a BSC, FIG. 13 is an explanatory diagram illustrating a continuous control configuration of the burst operation by a combination of setting of a burst operation start address and a frequency of a burst in a 32-byte burst access.

DETAILED DESCRIPTION OF THE PREFERRED EMBODIMENTS

Figure 1:
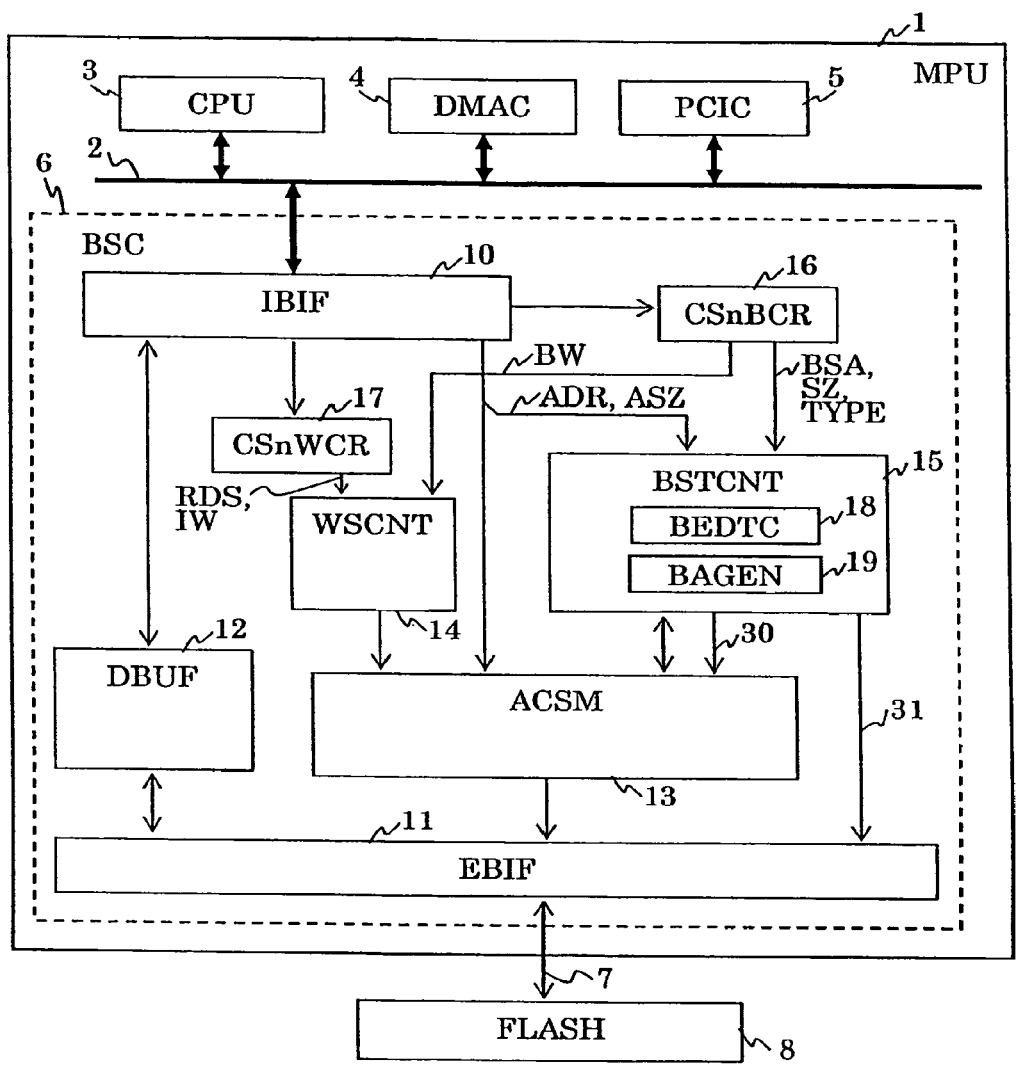
FIG. 1 is a block diagram showing an example of a data processor.

FIG. 1 shows an example of a data processor. A data processor 1 is formed on a semiconductor substrate such as a single crystal silicon by a complementary MOS integrated circuit manufacturing technique, which is not particularly restricted. The data processor 1 includes a central processing unit (CPU) 3 and a direct memory access controller (DMAC) 4 to be bus masters, a PCIC (peripheral component interconnect controller) 5 to be an interface controller, and a bus state controller (BSC) 6 to be an external memory controller on an internal bus 2 which is typically shown. The CPU 3 has an instruction control portion and an executing portion, and the instruction control portion fetches and decodes an instruction, controls a calculation carried out by the executing portion in accordance with a result of the decoding, and executes the instruction. The DMAC 4 carries out a single address transfer and a dual address transfer in accordance with a data transfer control condition set by the CPU 3. A PCI bus is connected to the PCIC 5.

The BSC 6 includes an internal bus interface circuit (IBIF) 10 to be connected to the internal bus 2 and an external bus interface circuit (EBIF) 11 to be connected to an external bus 7. Data are transferred between the IBIF 10 and the EBIF 11 through a data buffer (DBUF) 12. A control of an output timing of a strobe signal to a memory to be connected to the external bus 7 and an access cycle is carried out by the external bus control circuit 11 in accordance with an output of an access control state machine (ACSM) 13. A state transition control is carried out through the access control state machine 13 by referring to control information output from a wait control circuit (WSCNT) 14, control information output from a burst control circuit (BSTCNT) 15, and information about an address and an access size which are output from the IBIF 10. The BSC 6 has a control register (CSnBCR) 16 and a control register (CSnWCR) 17 to which a value can be set by the CPU 3. A flash memory (FLASH) 8 to be the external memory which is typically shown is connected to the external bus 7.

When an instruction for a read access is given upon receipt of a designation of an address and an access size from the CPU 3, for example, the BSC 6 decides an address area specified by an address and controls a burst read access for the flash memory 8 at a frequency of a burst corresponding to the access size by setting the specified address to be a head based on the state transition control of the access control state machine 13 in accordance with the setting of the registers 16 and 17 corresponding to the address area which is decided. The burst control circuit 15 carries out a necessary address increment for a burst access by setting, as a head, an address supplied from the CPU 3. Furthermore, the burst control circuit (BSTCNT) 15 manages the frequency of the burst which is executed and carries out a control for giving an instruction to an external interface circuit 11 if an interruption of the burst access is required in the middle. The wait control circuit (WSCNT) 14 gives an instruction for a necessary wait cycle in an access cycle to the access control state machine (ACSM) 13.

Before an explanation of the details of the BSC 6, first of all, description will be given to the flash memory 8.

Figure 2:
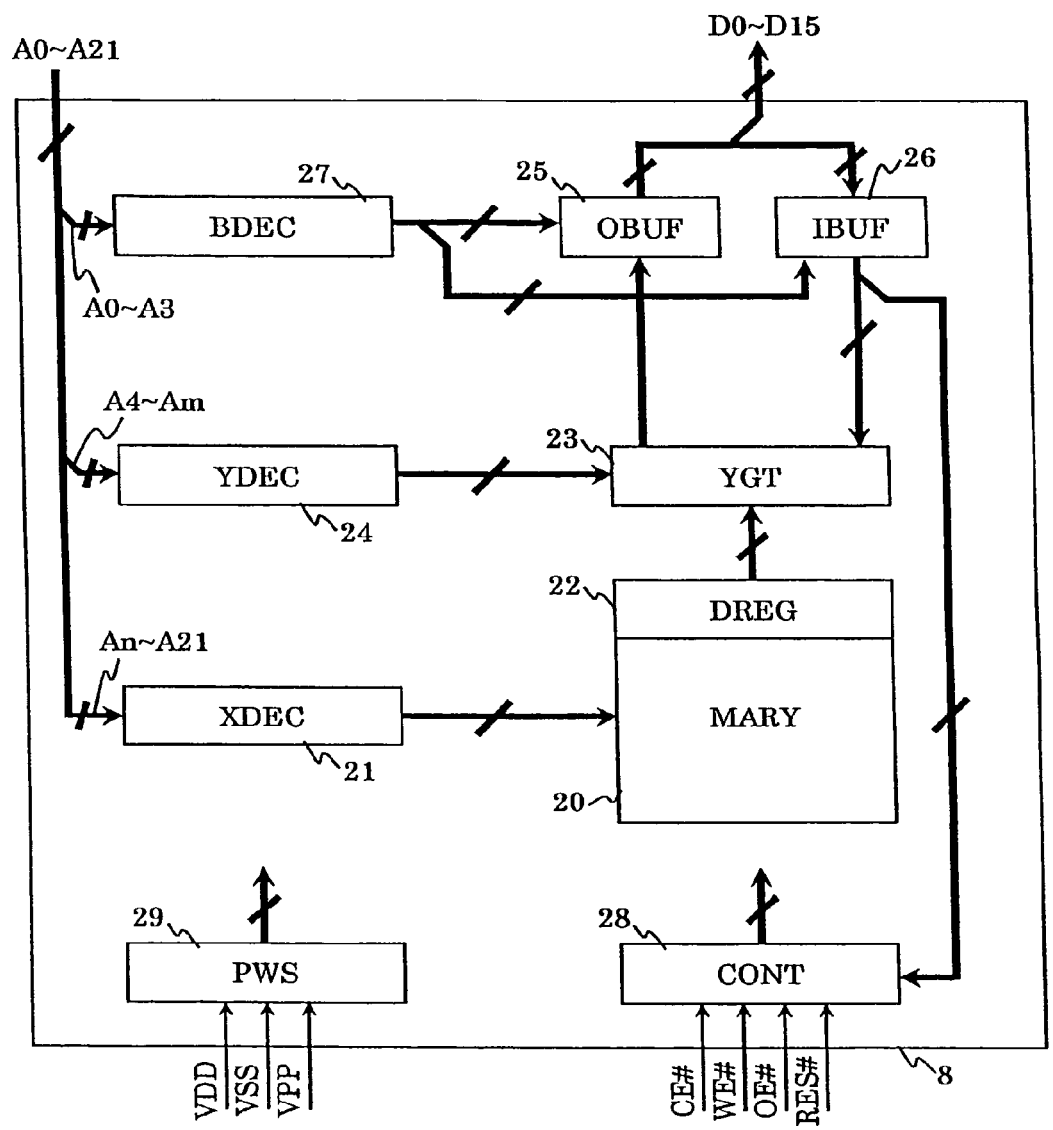
FIG. 2 is a block diagram showing an example of a flash memory.

FIG. 2 shows an example of the flash memory 8. The flash memory 8 is formed on a semiconductor substrate such as a single crystal silicon.

The flash memory 8 inputs access control signals, for example, a chip enable signal CE#, a write enable signal WE#, an output enable signal OE# and a reset signal RES#, and a source voltage VDD, a ground voltage VSS and a high voltage VPP for a write and erase processing are supplied as operating voltages to the flash memory 8. Address signals A0 to A21 are address input terminals or address signals. D0 to D15 are data input/output terminals or data. The symbol "#" attached to the access control signal indicates a low enable signal.

20 denotes a memory array (MARY) which includes a memory mat and a sense latch circuit. The memory mat has a large number of electrically erasable and writable nonvolatile memory cells and forms an array configuration of an AND or NOR type in which a data terminal of the nonvolatile memory cell is connected to a bit line in parallel, which is not particularly restricted.

The nonvolatile memory, cell can employ a proper memory cell structure such as a stacked gate structure in which a control gate is superposed on a floating gate through an insulating film or a split gate structure in which a selection transistor and a storage transistor having a silicon nitride film are disposed in series, which is not particularly shown. For example, in case of a nonvolatile memory cell having the stacked gate structure, a control gate, a drain and a source are connected to a word line, a bit line and a source line, respectively. An erasure processing for the nonvolatile memory cell having the stacked gate structure is not particularly restricted but is set to be a processing of applying a high positive voltage as an erase bias to the control gate and discharging an electron of a floating gate, thereby dropping a threshold voltage. A write processing for the nonvolatile memory cell having the stacked gate structure is not particularly restricted but is set to be a processing of applying a high negative voltage as a write bias to the drain and injecting an electron into the floating gate, thereby raising a threshold voltage. A read processing is set to be a processing capable of selecting a memory cell transistor by setting a predetermined read deciding level to be a word line selecting level and detecting stored information depending on a change in a current flowing to the bit line or a change in a level which appears on the bit line.

The word line and the source line are selected by an output of an X decoder (XDEC) 21. A data register (DREG) 22 is connected to the bit line and holds data read from the nonvolatile memory cell onto the bit line depending on the selection of the word line or write data. A Y gate (YGT) 23 is constituted by a switch circuit for selecting an input/output node of the data register 22 on a 16-byte unit, and the switch circuit is selected by an output of a Y decoder (YDEC) 24. The 16-byte input/output node of the data register 22 selected by the Y gate 23 is connected to an input terminal of an output buffer (OBUF) 25, and furthermore, is connected to an output terminal of an input buffer (IBUF) 26. The output buffer 25 and the input buffer 26 are set to be burst buffers which are used in a burst operation and have storage capacities of 16 bytes, respectively. A 16-byte storing portion of the output buffer 25 is selectable on a 2-byte unit, and two bytes which are selected are connected to 16-bit data input/output terminals D0 to D15 through an output terminal. Similarly, a 16-byte storing portion of the input buffer 26 is also selectable on a 2-byte unit and two bytes which are selected are connected to the 16-bit data input/output terminals D0 to D15 through an input terminal. The selection of the two bytes for the 16-byte storing portion is carried out by an output of a buffer decoder (BDEC) 27. Low-order 4-bit address signals A0 to A3 are given to the buffer decoder 27. High-order address signals A4 to Am are given to the YDEC 24 and higher-order address signals An to A21 are given to the XDEC 21.

A control circuit (CONT) 28 carries out a control of an operation of the flash memory 8 and a power circuit 29 outputs an internal voltage such as a high voltage which is required for write and erase processings. An instruction for the operation of the flash memory 8 is given to the control circuit 28 through the access control signal and a command. The command is input from the data input/output terminals D0 to D15 in response to a specific state of the access control signal.

The start of an erase processing and a write processing and a verify processing for the nonvolatile memory cell are not particularly restricted but are designated through a command. When the chip enable signal CE# is enabled and the write enable signal WE# is enabled, they are input to the input buffer 26 in accordance with a change in an address signal and are internally transferred from the input buffer 26 into the data register 22 through the YGT 23 so that the write data to be used for the write processing are input. When the write data are to be input, it is possible to utilize a burst operation which will be described below. In the write processing, the selection and non-selection of an application of a write voltage is controlled in accordance with a logical value of the write data held in the data register 22. Before the write processing, a nonvolatile memory cell corresponding to one word line to be a write processing object is subjected to the erase processing in a state in which stored information is previously saved in the data register 23.

In a reading operation, a flash memory implements a static RAM interface capable of reading data stored in an address after a certain access time in response to an input of the address. More specifically, when the chip enable signal CE# is enabled and the output enable signal OE# is enabled, stored data which are selected from a memory array in response to an address signal, selected by the YGT 23 and selected by the OBUF 25 are output to an outside. The operation is a single read. When the address signal is changed within a range of the low order addresses of A0 to A3 corresponding to a storage capacity of the OBUF 25 after the single read, the selection in the memory array and the selecting state brought by the YGT 23 are not changed. If the output enable signal OE# is exactly maintained in the enable level to enable a data outputting operation, therefore, it is possible to select the data held in the OBUF 25 and to output them from the data terminals D0 to D15 to the outside in a shorter access cycle than the single read. The operation is a burst read.

Figure 3:
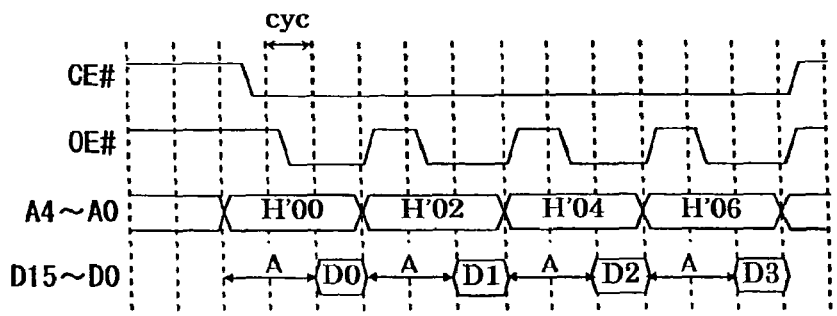
FIG. 3 is a timing chart showing a single read.

FIG. 3 is a timing chart illustrating the single read. When an operation clock cycle of the CPU 3 is indicated as cyc, each memory cycle is set to be three cycles.

Figure 4:
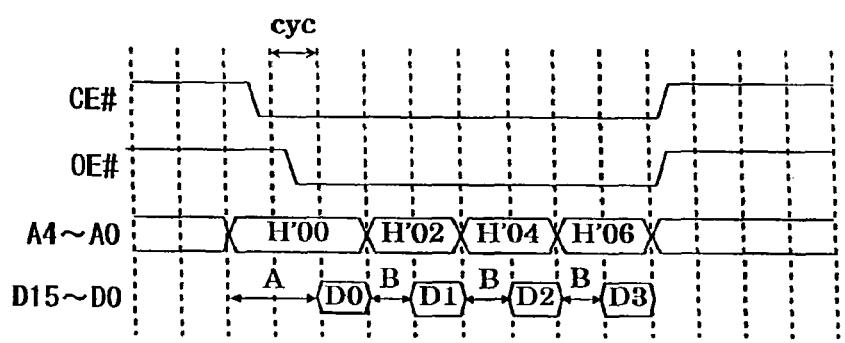
FIG. 4 is a timing chart showing a burst read.

FIG. 4 is a timing chart illustrating the burst read. A first access is carried out in three cycles in the same manner as in the single read, and then, a memory operation is performed in two cycles which are required for executing the read operation by a data transfer from the output buffer 25 to the external terminals D0 to D15. A and B represent a time taken from a change in an address to an output of data.

When causing the flash memory 8 to carry out a burst reading operation, the burst control circuit 15 of the BSC 6 performs a control for maintaining a time required for updating data of the buffer 25 by data transmitted from the memory array 20 through a memory operation responding to a read request exceeding the address range of A0 to A4 if it detects the read request, thereby executing the burst reading operation of the memory continuously. In a different sense, when detecting a read request exceeding the address range of the data held in the buffer 25 (a variable range of A0 to A4), the burst control circuit 15 carries out an access control for maintaining a time required for updating the data of the buffer 25 by the data transmitted from the memory array 20 through the memory operation in response to the read request.

Figure 5:
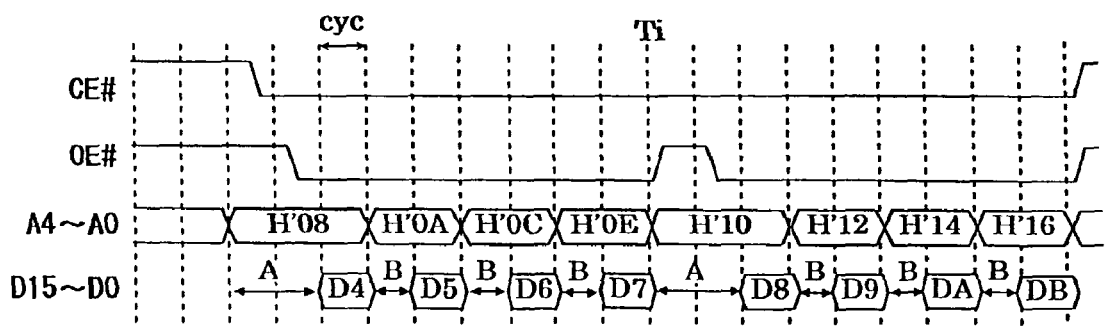
FIG. 5 is a timing chart showing a burst read through a control for continuously carrying out a burst operation.
Figure 6:
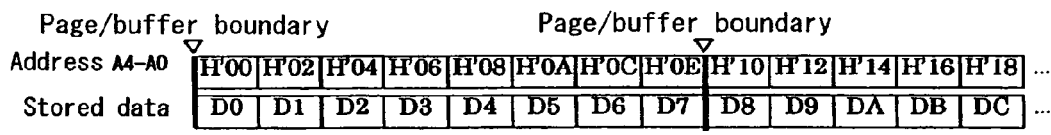
FIG. 6 is an explanatory diagram illustrating a relationship between a buffer boundary and an address.

FIG. 5 is a timing chart showing a burst read to be carried out by a control for continuously performing the burst operation. For the buffer 25 having 16 bytes, the frequency of the burst is set to be eight and a start address is set to be an address H'08 in the middle of the buffer boundary. FIG. 6 illustrates a relationship between the buffer boundary and the address which will be taken into consideration. The address bit A4 is changed in the middle of a burst access (time T1). In short, an access address exceeds the address range (the variable range of A0 to A4) of the data held in the buffer 25. At this time, the BSC 6 negates the output enable signal OE# to wait for a timing in which an access time of a next access (an access to an address H'10) is the same as a first burst access, and the output enable signal OE# is asserted again. Consequently, it is possible to output the data to the outside by waiting for a transfer of data in the access address in which A0 to A4 are changed to H'10 from the memory array 20 to the buffer 25. Then, the output enable signal OE# is asserted to the end and the burst read is repeated during that time.

Figure 7:
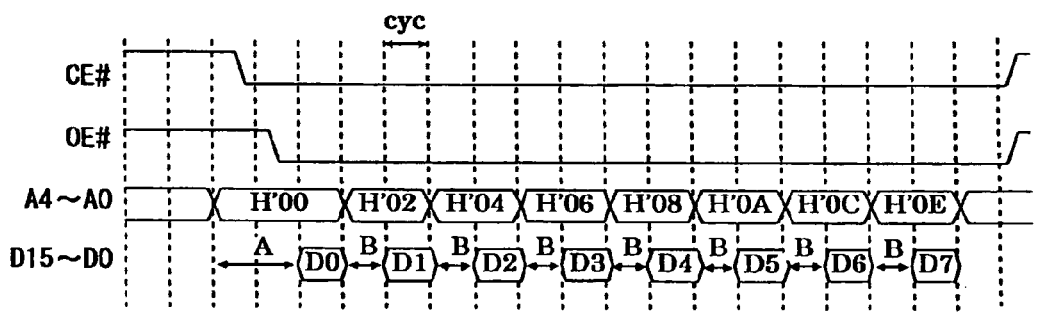
FIG. 7 is a timing chart showing a state in which a burst access is continuously given eight times without negating OE# in the middle because a burst access is not given across an address buffer boundary when a start address is H'00 of the buffer boundary.

In the case in which the start address is H'00 of the address buffer boundary as shown in FIG. 7, the burst access is not given across the boundary of the buffer 25. Therefore, the burst access is given continuously eight times without negating the output enable signal OE# in the middle.

Figure 8:
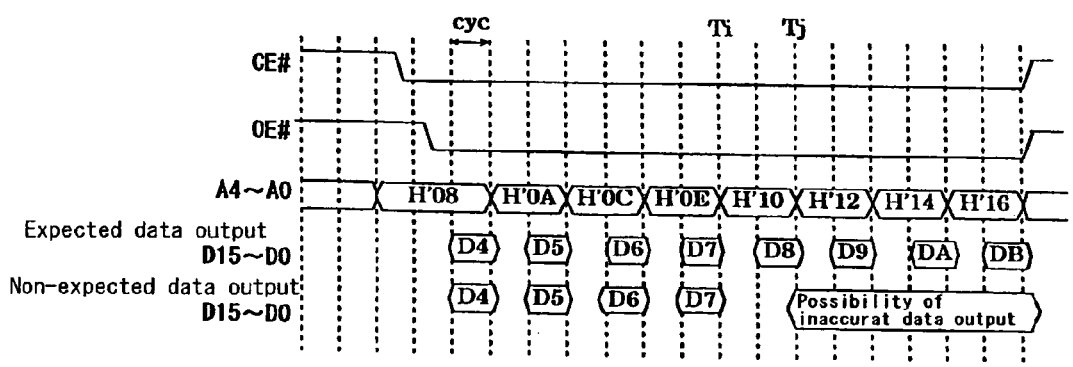
FIG. 8 is a timing chart showing a burst read in the case in which a frequency of a burst is set to be eight for a 16-byte buffer and a start address is set to be an address H'08 in the middle of the buffer boundary, and a control for continuously carrying out a burst operation is not carried out.

FIG. 8 is a timing chart showing a burst read in the case in which the frequency of the burst is set to be eight and the start address is set to be the address H'08 in the middle of the buffer boundary for the 16-byte buffer 25, and a control for continuously performing the burst operation is not executed. An access exceeding the buffer boundary is set to be the same access cycle. As a result, data in an access address in which A0 to A4 are changed to H'10 are decided to be output to the outside without waiting for a transfer from the memory array 20 to the buffer 25. In addition, the address is also changed to be a next. As a result, there is a possibility that at least the read data of H'10, and furthermore, subsequent data might be changed to have undesirable values.

Next, detailed description will be given to the bus state controller (BSC) 6 for supporting the continuous control of the burst operation.

FIG. 9 is an address map showing a local address space assigned to the BSC 6. The continuous control of the burst operation is set to be effective in an address space excluding areas 3 and 7, that is, an address space in which the burst ROM can be selected.

Figure 10:
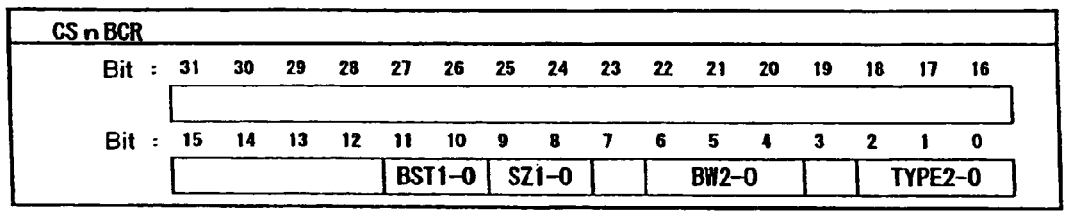
FIG. 10 is an explanatory diagram showing a field of a register CSnBCR related to a continuous control of the burst operation.
Figure 11:
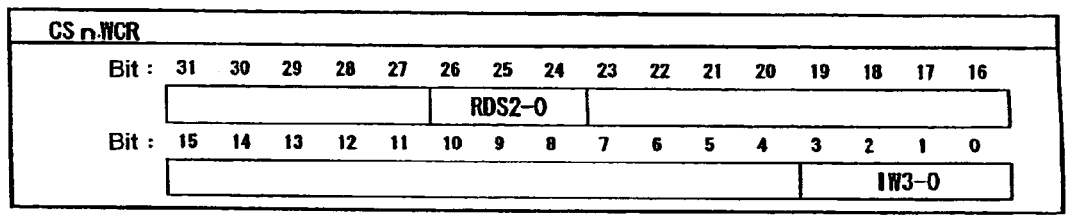
FIG. 11 is an explanatory diagram showing a field of a register CSnWCR related to the continuous control of the burst operation.

FIG. 10 shows a register field of a CSnBCR 16 related to the continuous control of the burst operation. FIG. 11 shows a register field of a CSnWCR 17 related to the continuous control of the burst operation. The registers 16 and 17 are provided for each area of the address space of FIG. 9.

A 2-bit field of BST1-0 specifies the frequency of the burst, that is, 00: four times at a maximum, 01: eight times at a maximum, 10: 16 times at a maximum (only when a bus width is set to be 8 and 16 bits), and 11: 32 times at a maximum (only when a bus width is set to be 8 bits).

A 2-bit field of SZ1-0 specifies the bus width, that is, 00: setting prohibition, 01: 8 bits, 10: 16 bits and 11: 32 bits.

A 3-bit field of BW2-0 specifies a burst pitch (an access time after a second burst), that is, 000: nothing, 001: one cycle, 010: two cycles, 011: three cycles, 100: four cycles, 101: five cycles, 110: six cycles, and 111: seven cycles.

A 3-bit field of TYPE2-0 specifies a memory type to be connected, that is, 000: SRAM, 001: byte control SRAM, 010: burst ROM, and 100: PCMCIA. The PCMCIA represents a memory card in accordance with the Personal Computer Memory Card International Association standards.

A 3-bit field of RDS2-0 specifies the number of wait cycles to be inserted from the assertion of the chip enable signal CE# to that of the output enable signal OE#, that is, 000: nothing, 001: one cycle, 010: two cycles, 011: three cycles, 100: four cycles, 101: five cycles, 110: six cycles, and 111: seven cycles. The cycle implies an operation clock cycle cyc of a CPU, for example.

A 4-bit field of IW3-0 specifies a wait cycle to be inserted from the assertion of the output enable signal OE# to a read of data, that is, 0000: nothing, 0001: one cycle, 0010: two cycles, 0011: three cycles, 0100: four cycles, 0101: five cycles, 0110: six cycles, 0111: seven cycles, 1000: eight cycles, 1001: nine cycles, 1010: eleven cycles, 1011: thirteen cycles, 1100: fifteen cycles, 1101: seventeen cycles, 1110: twenty-one cycles, and 1111: twenty-five cycles.

The continuous control of the burst operation is effective when the memory type is set to the burst ROM. A first access time of the burst access is specified by setting the field IW3-0 of the CSnWCR.

Figure 12:
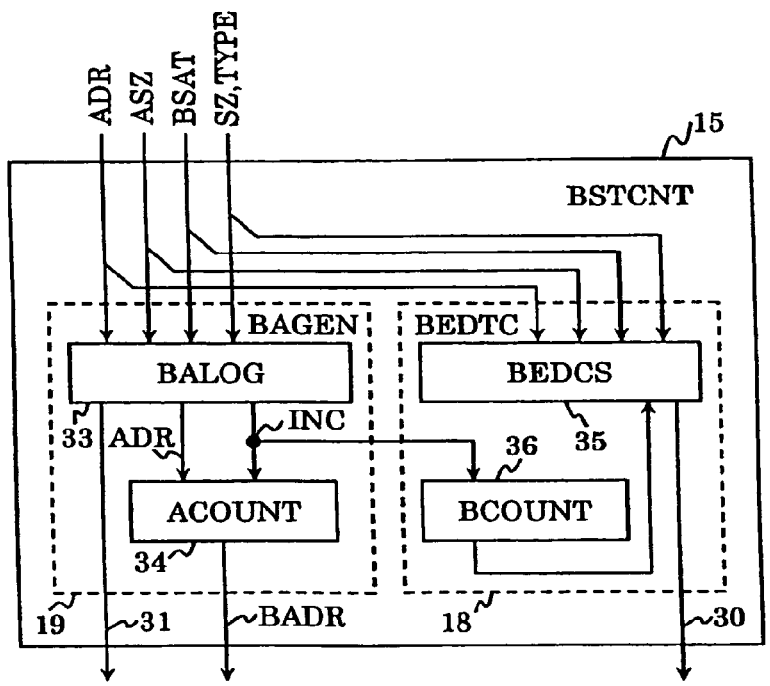
FIG. 12 is a block diagram showing an example of a burst stop detecting circuit (BSTED) 18.

FIG. 12 shows a detailed example of the BSC 6. The BSC 6 has a burst stop detecting circuit (BEDTC) 18 and a burst address generating circuit (BAGEN) 19. The generation of an address for a burst access is carried out by a burst address generating circuit (BAGEN) 19. The BAGEN 19 has an address control logic (BALOG) 33 and an address counter (ACOUNT) 34. An access detection is carried out across the boundary of the output buffer 25 to be the burst buffer by the burst stop detecting circuit (BEDTC) 18. The BEDTC 18 has a burst stop deciding circuit (BEDCS) 35 and a burst frequency counter (BCOUNT) 36.

The address control logic 33 inputs information about a burst frequency (BSAT) set to a field BST1-0 of the register (CSnBCR) 16 for each area, a bus width (SZ) set to a field SZ1-0, a memory type (TYPE) set to a field TYPE2-0, an address (ADR) of an access destination and an access size (ASZ), and causes the address counter 34 to generate a burst address BADR with the address (ADR) set to be a head. An address increment and a frequency of the address counter 34 are determined depending on the bus width and the access size (ASZ). The BALOG 33 outputs, to the external interface circuit 11, a signal 31 indicating that the burst is being carried out.

The burst stop deciding circuit 35 inputs the information about the burst frequency (BSAT) set to the field BST1-0 of the register (CSnBCR) 16 for each area, the bus width (SZ) set to the field SZ1-0, the memory type (TYPE) set to the field TYPE2-0, the address (ADR) of the access destination and the access size (ASZ), and furthermore, inputs a count value of the burst frequency counter 36, and gives a burst stop indicating signal 30 indicative of a stop of a burst access to the access control state machine 13 when detecting a read request exceeding the address range (the variable range of A0 to A4) of the data held in the buffer 25 based thereon. The state machine 13 designated to stop the burst gives the external interface circuit 11 an instruction for setting an access time of a next access to be equal to that of a single access. Consequently, the external interface circuit 11 negates the output enable signal OE# as is illustrated in the time T1 in FIG. 5. The burst control circuit 15 outputs, to the external interface circuit 11, the signal 31 indicating that the burst is being carried out, and the external interface circuit 11 continuously asserts the output enable signal OE# if the burst is being carried out. When the burst stop is detected in response to the burst stop indicating signal 30, the output enable signal OE# is negated. The burst frequency counter 36 carries out an increment operation of +1 in response to an increment indicating signal INC of the address counter 34, thereby counting a total burst frequency. The burst stop deciding circuit 35 decides a burst stop until the count value of the burst frequency counter 36 reaches a burst frequency specified by the register, and the total burst frequency determined by an access size and a bus width.

A burst pitch (BW) set to the field BW2-0 of the register (CSnBCR) 16 and a wait number (RDS, IW) set to the fields RDS2-0 and IW3-0 of the register (CSnWCR) 17 are supplied to the wait control circuit 14 shown in FIG. 1, and an instruction for an insertion of a wait cycle specified by them is given to the access control state machine 13. The access control state machine 13 to which the instruction for the insertion of the wait cycle is given causes the external interface circuit 11 to control an assert timing of OE# after the CE# assertion, a read timing of read data after the CE# assertion, and a read timing of the read data during the burst operation in accordance with the number of wait cycles which is specified. When the burst stop is detected in response to the burst stop indicating signal 30 so that the output enable signal OE# is negated (the time T1 in FIG. 5), the access control state machine 13 causes the external interface circuit 11 to control a timing for asserting the output enable signal OE# in accordance with the number of wait cycles specified by the field RDS2-0.

For a control other than the continuous control of the burst operation, other set values of the registers 16 and 17 are supplied to the ACSM 13, which is not particularly shown.

FIG. 13 illustrates a continuous control configuration of the burst operation by a combination of setting of a burst access start address and a burst frequency in a 32-byte burst access. FIG. 13 shows the case in which the burst access has an access size of 32 bytes, and a bus width and a burst frequency are set to be matched with the access size of 32 bytes. The burst access start address is caused to be selectable in a manner shown in FIG. 13, and a right column sequentially shows a low order address across the buffer boundary until the access size of 32 bytes is reached. In brief, it is to be understood that FIG. 13 shows control specifications of the 32-byte burst access through the BSC 6 for various external memories having different bus widths and burst buffer sizes. In FIG. 13, particularly, the continuous control of the burst access is carried out for an access to be started in an address described in a thick frame region.

For example, in case of the flash memory 8 of FIG. 2, a burst access is permitted in a bus width of 16 bits and a burst frequency of 4 or 8. The reason is that the burst buffer 25 provided in the flash memory 8 of FIG. 2 has a storage capacity of 16 bytes. In the case in which the data processor 1 carries out a burst access for the flash memory 8 in a bus width of 16 bits and a burst frequency of 8, the burst access is performed in total of 16 times having 8 times from H'00 if the burst access start address is H'00 and 8 times from an address of H'10. On the other hand, when the start address is H'08, the continuous control of the burst operation is carried out and the access cycle is extended in the same manner as the single read in the address of the buffer boundary of H'10 and H'00. Consequently, a burst access in total of 32 bytes is performed. In short, the burst access is carried out in total of 32 times including 8 times from H'08, 16 times from H'10 and 8 times from H'00. Also in the case in which the burst access is thus carried out, it is preferable to give an instruction of 32 bytes in an access size at a burst frequency of eight. It is not necessary to give an instruction for a burst access in a division into three times, that is, an access size of 8 bytes at a burst frequency of four, an access size of 16 bytes at a burst frequency of eight and an access size of 8 bytes at a burst frequency of four. The data processor has a specification for selecting the burst buffer 25 in wraparound within a range of 32 bytes when the start address is not placed on the boundary of the burst buffer 25, which is not particularly restricted. For this reason, the burst address passes through H'10 and H'00 in the middle and finally reaches H'07 when the start address is H'08 in the burst access.

As described above, the BSC 6 temporarily stops the burst operation of the flash memory 8, waits for a completion of the data read from the memory array 20 to the burst buffer 25 in the flash memory 8 and continuously carries out the burst operation of the flash memory 8 again in the case in which the burst access to the flash memory 8 is given across the boundary of the burst buffer 25 in the flash memory 8 during the execution of the burst access. When temporarily stopping the burst operation of the flash memory 8, the BSC 6 negates the output enable signal OE# and causes a period for outputting an address to be equal to a first memory access of the burst access, thereby waiting for data to be read onto the burst buffer 25. Consequently, it is possible to enhance a throughput of the access to the flash memory 8, and furthermore, to operate external memories of more types by means of a data processor. It is not necessary to prohibit, in software, a burst access to be started in the middle of the burst buffer in order to prevent the burst access from being given across the boundary of the burst buffer and to limit the frequency of the burst in order to prevent the burst access from being given across the boundary of the buffer in the middle.

When inputting write data, the flash memory may be burst operable. More specifically, when fetching the write data from the input buffer 26 to the data register 22 through the YGT 23, the data processor 1 may write the write data to the input buffer 26 through a burst write access. At this time, it is necessary to internally transfer the write data from the input buffer 26 to the data register 22 before a higher order than the write address A4 is changed. When the bit A4 of the write address is changed during the burst access, a countermeasure is previously taken by extending an access address output period corresponding to a necessary period of time for internally transferring the write data held in the input buffer 26 to the data register 22.

While the invention made by the inventor has been specifically described above based on the embodiment, the invention is not restricted thereto but it is apparent that various changes can be made without departing from the scope thereof.

For example, the external memory is not restricted to the flash memory but a mask ROM, an EEPROM and an SRAM may be used. The burst buffer size is not restricted to 4, 8, 16 and 32 bytes but it is a matter of course that the other sizes may be used. The data processor may comprise a bus master other than a CPU and a DMAC or other bus slave circuits. It is also possible to employ a cache memory or an address converting buffer for virtual storage.

The invention can be widely applied to data processors including a memory controller and serving to carry out a data processing, for example, a microprocessor, a microcomputer and a system on-chip LSI.

What is claimed is:

1. A data processor comprising:
a central processing unit; and
a memory controller capable of controlling an external memory via an external bus,
wherein the memory controller is adapted to be coupled to the external memory which has a buffer to store predetermined size data, and the predetermined size data includes data of an address range corresponding to low order side a plurality of bits of an address signal, the memory controller being further adapted to perform a burst operation between the buffer and the data processor according to an access request in which an access address is changed within the address range,
wherein the memory controller outputs a chip enable signal, an output enable signal, and the address signal to the external memory via the external bus to control the external memory,
wherein the memory controller performs an access control for executing the burst operation of the external memory continuously, if it detects a burst access of a boundary of the buffer by exceeding the address range from a change in a higher order bit than a predetermined bit number on the low order side, during control of the burst operation,
wherein the access control performed by the memory controller includes control to output the chip enable signal, to negate temporarily the output enable signal, to stop the burst operation, and to assert again the output enable signal,
wherein the memory controller includes a register having:
a field to specify a burst frequency,
a field to specify a bus width of the external bus,
a field to specify an access time after a first burst,
a field to specify a memory type of the external memory,
a field to specify a first number of wait cycles to be inserted between assertion of the chip enable signal and assertion of the output enable signal, and
a field to specify a second number of wait cycles to be inserted between assertion of the output enable signal and a read of data,
wherein the memory controller includes a burst counter to count the burst frequency specified by the register, a circuit to generate an address signal for the burst operation corresponding to a start address received from the central processing unit, and a burst stop detect circuit to detect a burst access exceeding the address range of data stored in the buffer,
wherein the burst counter counts continuously until reaching the burst frequency value of the register after stopping the burst operation when the access of exceeding the address range is detected, and
wherein the burst stop detect circuit includes the burst counter, and a burst stop deciding circuit generating a burst stop signal after receiving the access request exceeding the address range of data stored in the buffer, based on the burst frequency, the bus width, the memory type specified by the register, the access address, an information of the access size and the counter value of the burst counter.

2. A data processor according to claim 1,
wherein the memory controller negates the output enable signal during the first number of wait cycles specified by the register corresponding to the burst stop signal.

3. A data processor according to claim 2,
wherein the memory controller controls the burst operation for the external memory corresponding to the value of the register after receiving a read access instruction with a start address from the central processing unit.

4. A data processor according to claim 3, further comprising a direct memory access controller adapted to access the external memory via the memory controller.

5. A data processor according to claim 4, wherein the burst frequency of the register is set to be m/n at a maximum when a storage capacity of the buffer is set to be m bytes and a width of the external bus is set to be n bytes.

6. A data processor according to claim 5, wherein the external memory includes at least one memory selected from a flash memory, an EEPROM, a mask ROM and an SRAM.

7. A data processor according to claim 6,
wherein the memory controller continues the burst operation until reaching a value specified by the burst frequency field of the register, and
wherein the memory controller continuously outputs the chip enable signal during the burst operation.

* * * * *